F. W. WITTE.
BALL BEARING.
APPLICATION FILED OCT. 1, 1912.
1,161,570.
Patented Nov. 23, 1915.
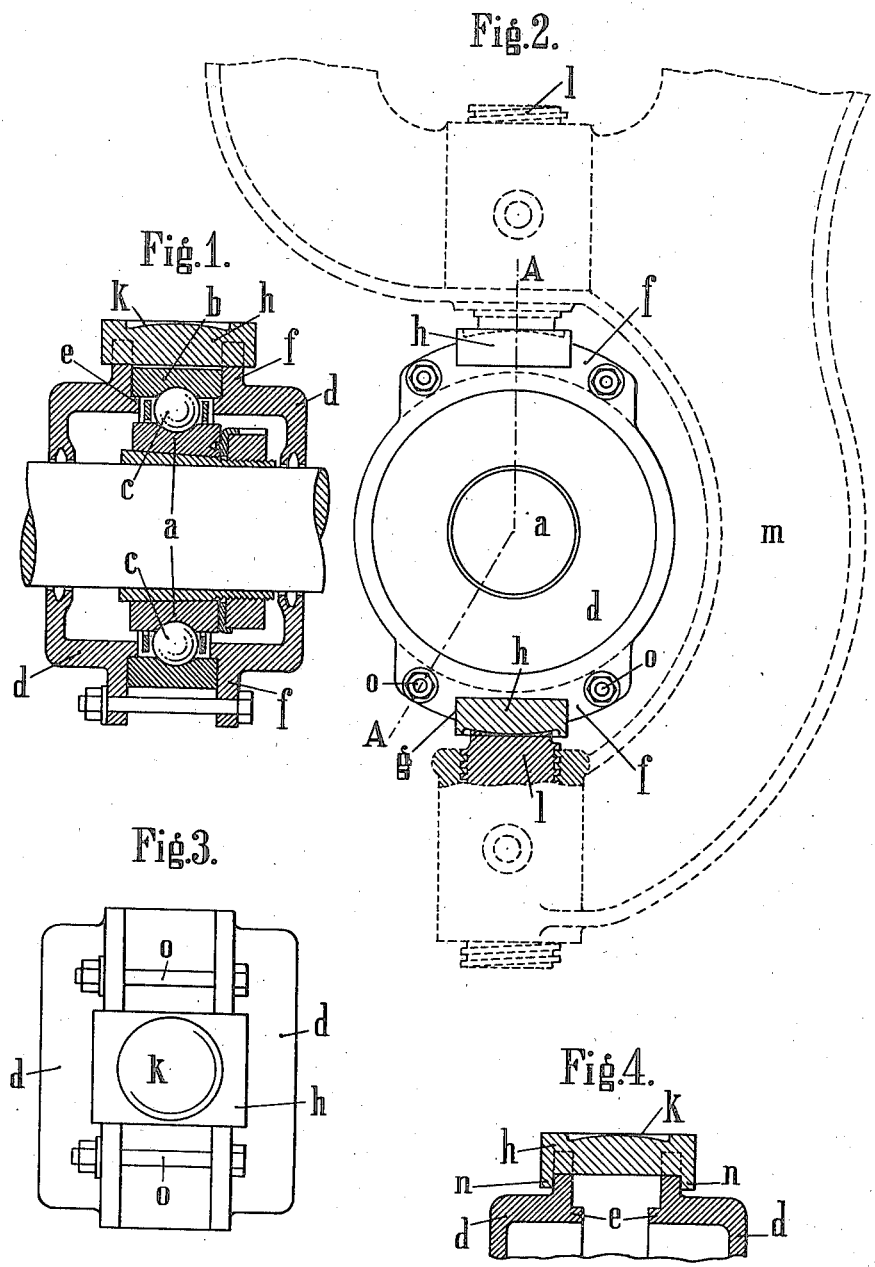
WITNESSES
George Du Bon
Louis Alexander
INVENTOR
Friedrich Wilhelm Witte
BY
ATTORNEYS

UNITED STATES PATENT OFFICE.

FRIEDRICH WILHELM WITTE, OF LEIPZIG-PLAGWITZ, GERMANY, ASSIGNOR TO DEUTSCHE KUGELLAGERFABRIK GESELLSCHAFT MIT BESCHRANKTER HAFTUNG, OF LEIPZIG-PLAGWITZ, GERMANY.

BALL-BEARING.

1,161,570.  Specification of Letters Patent.  Patented Nov. 23, 1915.

Application filed October 1, 1912. Serial No. 723,290.

*To all whom it may concern:*

Be it known that I, FRIEDRICH WILHELM WITTE, a citizen of the United States, and a resident of Leipzig-Plagwitz, Germany, have invented certain new and useful Improvements in Ball-Bearings, of which the following is the specification.

It is the general endeavor to arrange the self-adjusting ball-bearings for line-shafts in such a manner, that they can be exchanged if possible everywhere for the existing friction bearings, without any alterations to the other parts being necessary. This possibility has hitherto been prevented by one reason, namely the comparatively large radial extension of the ball-bearings. It has been tried to reduce this radial extension of the ball-bearings and the outer casing of the ball-bearing has therefore been omitted and the outer race ring has been provided with the bearing surfaces which will allow of the self-adjustment in the plumber-blocks; as it is however unavoidable, that the screws serving to hold the bearing in the plumber-block are tightened too much the known ball bearings showed the drawback, that the outer race ring would soon be deformed under the pressure of these screws. And for avoiding such deformation the outer race had to be made much thicker, whereby again the radial dimension of the ball-bearing was increased.

The object of the present invention is to remove this difficulty. The ball bearing is thereby rendered proof against any excessive tightening of the screws and at the same time its radial extension is reduced to a minimum, so that it can be fitted into any existing plumber-block or hanger.

The present invention consists in the outer race ring being relieved of the pressure exerted by the set-screws by this pressure being taken up by the caps closing the sides of the ball-bearing. These caps have a great moment of resistance in an axial direction, so that they are well able to take up a considerable stress without being deformed. The manner, in which the outer race ring is relieved by the caps may differ. This may be effected in an extremely simple manner by the caps or flanges provided on said caps bearing from inside against the outer race ring and thereby protecting the same against all deformation. It will, however, be preferable if the outer race ring is rendered entirely independent of the bearing surfaces allowing of the selfadjustment of the bearing and these bearing surfaces are in connection with the said caps closing the sides. In such case the outer ball race need not be machined at all on its outside surface and may be made of the standard dimensions.

In the accompanying drawing a constructional form of the invention is exemplified, showing a hanger bearing.

Figure 1 is a sectional view along the line A—A in Fig. 2. Fig. 2 is a side view and Fig. 3 is a plan of the bearing. Fig. 4 illustrates how the invention is employed with collar bearings.

The bearing consists in known manner of the inner ball race ring $a$ and the outer race ring $b$ and the set of balls $c$ between these races. At both sides the bearing is closed by the caps $d$ which bear against the outer race ring $b$. The caps $d$ have besides an annular flange $e$ on their insides, which fits with its outer diameter exactly into the outer ball race and thereby protects the same against all deformation. The caps are pressed by means of screws $o$ against the race-ring. Both caps have each two diametrically opposite lugs $f$. Each of these lugs $f$ has a notch $g$. These notches $g$ serve to receive the bearing members $h$ which are displaceable in said notches in a direction parallel to the axis of the shaft. The notches $g$ are cut only so deep into the lugs $f$, that the bearing members $h$ will not come into contact with the outer ball race and a clear space is left between. The bearing members $h$ have on their outside spherical surfaces which fit in known manner in correspondingly shaped sockets in the ends of the set-screws $l$. These set-screws $l$ can be screwed up and down in the body $m$ of the bearing and serve to raise or lower the axis of the shaft according to requirement. The bearing may thus follow all movements of the shaft, the bearing members $h$ swiveling in the spherical sockets and also being axially displaceable in the lugs $f$ and their notches $g$ respectively. With collar bearings (Fig. 4) where an axial displacement shall not be possible, ears $n$ are provided on the bearing members $h$ which engage from outside over the caps and prevent a displacement of the members $h$ in the said caps.

I claim:

1. In a device of the class described, a bearing, a support, means for adjusting said bearing relatively to said support, said bearing comprising an outer ball race ring, and means engaging the inner surface of said ring whereby the pressure of said adjusting means is resisted and deformation of said ring is prevented.

2. In an adjustable ball-bearing for line-shafts, a support, an outer ball-race ring, caps located at opposite sides of said ring and forming therewith a casing, adjusting screws for adjusting the position of said bearing relatively to said support, and annular flanges on said caps adapted to fit into said ring and form a rigid support therefor whereby the latter is protected against deformation through the pressure exerted by said adjusting screws.

3. In an adjustable ball-bearing for line-shafts, a support, an outer ball-race ring, caps located at opposite sides of said ring and forming therewith a casing, adjusting screws for adjusting the position of said bearing relatively to said support, annular flanges on said caps adapted to fit into said ring whereby the latter is protected against deformation through the pressure exerted by said adjusting screws for adjusting said bearing in said support in the direction of the axes of said screws and bearing blocks in engagement with said screws and arranged to permit adjustment of said bearing in directions at an angle to the axes of said screws, said bearing blocks being in engagement with said caps but free from said outer ball-race ring whereby the latter is relieved from the pressure exerted by said adjusting screws.

4. In an adjustable ball-bearing for line-shafts, a support, an outer ball-race ring, caps located at opposite sides of said ring and forming therewith a casing, lugs on said caps located in alinement in the axial direction of the shaft, bearing blocks carried by said lugs and movable relatively thereto in the direction of the axis of the shaft, spherical surfaces on said bearing blocks, and adjusting screws in said support arranged to engage said spherical surfaces to permit a swivel movement of the bearing, said bearing-blocks being free from said outer ball-race ring whereby the latter is relieved from the pressure exerted by said adjusting screws.

In witness whereof I have hereunto signed my name this 12th day of September, 1912.

FRIEDRICH WILHELM WITTE.

Witnesses:
  RUDOLPH FRICKE,
  WALTER ANDERS.